United States Patent Office 3,382,141
Patented May 7, 1968

3,382,141
DESICCANT PAPER
Hanns F. Arledter, Chillicothe, Ohio, and Edward R. Stacy and Clayton E. Burke, Lee, Mass., assignors to The Mead Corporation, Dayton, Ohio, a corporation of Ohio
No Drawing. Filed Nov. 8, 1963, Ser. No. 322,527
2 Claims. (Cl. 162—156)

This invention relates to the production of desiccant papers from inorganic materials. In addition to the desiccant properties, such papers are characterized by their ability to withstand high temperatures.

Accordingly, it is an object of this invention to produce from inorganic materials a desiccant paper having high heat resistance.

Another object is to produce a desiccant paper from inorganic materials using ordinary papermaking equipment and methods.

We have found that a desiccant paper having a high capacity for absorption of water can be made by incorporating an inorganic desiccant powder in a paperlike web of inorganic fibers at the wet end of a papermachine. The inorganic fibers, for example glass fibers, are beaten or brushed to separate the individual fibers, and the desiccant powder is dispersed in the beaten fibers prior to forming the paper on a papermachine. After forming, the web is dewatered, pressed, and dried as in the normal papermaking operations. Using this method, a low density, porous paperlike structure is produced in which the desiccant powder is substantially uniformly dispersed throughout the structure.

To utilize the desiccant properties, the dried web must be heated to a temperature sufficient to dehydrate (activate) the particular desiccant powder. For example, molecular sieve powder is activated at 600° F. For some other desiccant powders, the web may be heated to dehydrating temperatures during drying on the papermachine.

The addition of flocculants, binders, or sizing materials before or during the formation of the wet web is not necessary for producing the paper of this invention. However, binders, particularly inorganic binders such as a dispersion of bentonite, may be sprayed on the wet web after forming it on the wire. This would be particularly valuable where relatively thin papers or strong papers are desired.

The paper of this invention is made of substantially 100% inorganic materials and has the advantage over cellulosic desiccant papers that it can be used over a wide range of temperatures without seriously deteriorating the paperlike structure. In addition, desiccant materials having a high activating temperature can be used. Paper made by the process of this invention is especially useful in the electronic industry as a desiccant and electrically insulating material in encapsulated devices such as transistors. The encapsulating temperature is rather high and cellulosic desiccant papers would deteriorate at these temperatures. Papers made by the process of this invention are also useful as filter papers for a wide variety of materials, from filtering out and absorbing moisture from the air to the filtering of dirt and water from oils.

The inorganic fibers can be glass, quartz, asbestos, aluminum silicate or any other water insoluble inorganic fiber which can be formed on a papermachine. Glass fibers are preferred as they are relatively inexpensive and more readily available than the other inorganic fibers. The chemical composition of the fibers is not critical so long as the fibers are insoluble in water. Special fibers, as for example, acid leached glass fibers which are 99% silica, have the added advantage of having some desiccant properties due to the porous nature of the fiber caused by the leaching process.

The diameter of the fibers is important in that it affects retention of the desiccant powder and strength of the resultant paper web. For this reason, fibers having a diameter below 1 micron are preferred. However, fibers up to 10 microns in diameter can be used. A small amount of fibers having a diameter below 1 micron must be used in conjunction with the larger diameter fibers to retain the dissicant powder and provide a paper with enough strength to permit handling. For example, a mixture of 20% glass fibers having an average diameter of 0.62 micron and 80% glass fibers having an average diameter of 9 microns may be used. The effect of such a mixture would be to increase the porosity of the paper, and this would be an advantage where a more porous paper is desired. Mixtures of fibers of various diameters below 1 micron and/or fibers having a diameter larger than 1 micron may be used depending on the thickness of paper desired, strength of paper desired, porosity desired, and size and type of desiccant powder used. The length of the fiber is not critical so long as it is consistent with good paper formation.

Inorganic desiccant powders which may be activated at a temperature below their fusing point are satisfactory as the water absorbing material of this invention. The preferred desiccant powders are silica gel, molecular sieves, activated alumina and porous silica glass consisting essentially of 96% silica and 4% boric oxide. These desiccant powders are known to be water insoluble and porous. Molecular sieves are crystalline zeolites or similar materials from which the water of hydration has been removed leaving a network of cavities comprising roughly about one-half the total volume of the crystals. Molecular sieves of the general chemical formula of $0.96Na_2O \cdot 1.0Al_2O_3 \cdot 1.92SiO_2 \cdot xH_2O$ and also $0.83Na_2O \cdot 1.0Al_2O_3 \cdot 2.48SiO_2 \cdot xH_2O$ have been found to be especially adaptable for use in producing the paper of this invention. A molecular sieve having the same general chemical formula as the first mentioned example but having about 75% of the sodium ions replaced with calcium ions was also found to be satisfactory.

Desiccant powders having an average particle size from 0.01 micron to 50 microns, corresponding to mesh sizes of 50 to 3000, may be utilized in this invention. However, powders in the 100 to 325 mesh range are preferred. The ratio of desiccant powder to inorganic fibers is dependent a great deal on the properties desired in the finished sheet. Generally speaking, papers in which approximately 50% of the weight is desiccant powder have been preferred, however, papers containing 33 to 67% desiccant powders have been found to be satisfactory. Papers containing as low as 10% desiccant powder can be prepared and used where a high drying capacity is not needed. Papers containing about 67% and up to 75% desiccant powder can be made at the sacrifice of some paper strength, and if the requirement for freedom from dusting is not too severe. Above 75% desiccant powder, the paper becomes too weak to handle. Dusting can be prevented or minimized by using inorganic binders such as aluminum hydrate, bentonite, and colloidal silica. These materials also bond the fibers together and increase the strength of the paper web.

By way of illustration, but not by way of limiting the scope of our invention, the following specific examples are given.

Example 1

A glass fiber paper containing approximately 50% by weight of glass microfibers and 50% by weight of molecular sieves was prepared as follows. Glass microfibers having an average diameter of 0.62 micron were dispersed in water at approximately 1.5% consistency by subjecting them to a brushing action in a beater. After the fibers were dispersed, a quantity of 200 mesh molecular sieves of weight equal to the weight of the glass microfibers was added in the beater and dispersed by continued brushing action. This pulp mixture was diluted to approximately 0.5% consistency, supplied to the headbox of a fourdrinier papermachine, and formed into a wet web in the usual papermaking process after which it was dried at a temperature in excess of 225° F. The density of this resultant paper was 0.32 gram/cc. and the desiccant particles were sufficiently adhered to the paper or carried within the interstices of the paper web so that it could be handled with substantially no dusting or rubbing off of the desiccant powder particles. The paper had the following properties.

Basis weight _____ 102 pounds/3000 sq. ft.
Thickness _____ 24.4 mils (thousandths of an inch).
Dry tensile _____ 260 grams/inch.
Bursting strength __ 4.1 p.s.i.

After activation of the paper by heat at approximately 600° F., the amount of water absorbed based on the weight of activated molecular sieve at 300° F. and at a partial vacuum of $10^{-2}$ mm. of mercury was 14%.

Additionally, paper produced by Example 1 was conditioned for 4 hours at 300° F. after which it was allowed to come to equilibrium at 85% relative humidity and 82° F. The moisture pickup was 10.5% at equilibrium conditions based on the total weight of the conditioned paper.

Example 2

A paper was made according to the procedure of Example 1 using 50% by weight of 200 mesh silica gel instead of the molecular sieves. The paper produced had the following properties.

Basis weight _____ 122 pounds/3000 sq. ft.
Thickness _____ 28.1 mils (thousandths of an inch)
Dry tensile _____ 275 grams/inch.
Bursting strength __ 3.6 p.s.i.
Density _____ 0.33 gram/cc.

Substantially no dusting or rubbing off of the desiccant particles was observed. After activation of the paper by heat, the amount of water absorbed based on the weight of silica gel present at 300° F. and at a partial vacuum of $10^{-2}$ mm. of mercury was 5%.

Additionally, paper produced by Example 2 was conditioned for 4 hours at 300° F. after which it was allowed to come to equilibrium at 85% relative humidity and 82° F. The moisture pickup was 16.1% at equilibrium conditions based on the total weight of the conditioned paper.

Example 3

A paper was produced according to the procedure of Example 1 using approximately 50% by weight of activated alumina instead of the molecular sieves.

Example 4

A paper was produced according to the procedure of Example 1 using approximately 67% by weight of 200 mesh porous silica glass consisting essentially of 96% silica and 4% boric oxide and approximately 33% by weight of glass microfibers having an average diameter of 0.62 micron in the preparation of the pulp mixture.

Example 5

A paper was produced according to the procedure of Example 1 using approximately 33% by weight of 200 mesh molecular sieve and approximately 67% glass microfibers having an average diameter of 0.62 micron in the preparation of the pulp mixture.

The papers produced in Examples 3 through 5 showed little or no rubbing off of the desiccant powder particles. Papers strong enough to permit normal handling were produced in all of these examples. After heating these papers to the activating temperature of the desiccant, the papers absorbed moisture readily from the air. Examination did not show any deterioration of the paper structure due to the heat treatment.

It is evident that the products and processes of the instant invention may be modified by those skilled in the art without departing from the spirit thereof. Accordingly, the invention is to be limited only within the scope of the appended claims.

What is claimed is:

1. A paper comprising 25% to 90% of inorganic papermaking fibers, said inorganic papermaking fibers comprising at least 20% of inorganic fibers having a diameter below 1 micron, and 75% to 10% of a water insoluble, porous inorganic desiccant powder, said desiccant powder being substantially uniformly dispersed therein.

2. A paper comprising 33% to 67% of glass fibers, said glass fibers comprising at least 20% of fibers having a diameter below 1 micron, and 67% to 33% of a water insoluble inorganic desiccant powder selected from the group consisting of molecular sieve, silica gel, activated alumina and porous silica glass powders, said silica glass powder consisting essentially of 96% silica and 4% boric acid, said desiccant powder being substantially uniformly dispersed therein.

References Cited

UNITED STATES PATENTS

| | | | |
|---|---|---|---|
| 2,064,113 | 12/1963 | Heuser | 252—194 |
| 2,241,600 | 5/1941 | Hunsicker | 252—194 |
| 2,373,914 | 4/1945 | Quinn | 162—153 |
| 2,417,924 | 3/1947 | Gary | 252—194 |
| 2,554,934 | 5/1951 | Ayers | 162—153 |
| 3,017,318 | 1/1962 | Labino | 162—152 |

FOREIGN PATENTS 582,765    9/1959    Canada.

DONALL H. SYLVESTER, *Primary Examiner.*

HOWARD R. CAINE, *Examiner.*